(12) United States Patent
Simon et al.

(10) Patent No.: US 8,435,397 B2
(45) Date of Patent: *May 7, 2013

(54) DEVICE FOR FLUID SPREADING AND TRANSPORT

(75) Inventors: Steve Simon, Middletown, NJ (US); Victor A. Lifton, Bridgewater, NJ (US)

(73) Assignee: mPhase Technologies, Inc., Little Falls, NJ (US)

( * ) Notice: Subject to any disclaimer, the term of this patent is extended or adjusted under 35 U.S.C. 154(b) by 1043 days.

This patent is subject to a terminal disclaimer.

(21) Appl. No.: 12/020,209

(22) Filed: Jan. 25, 2008

(65) Prior Publication Data

US 2009/0188794 A1 Jul. 30, 2009

(51) Int. Cl.
*F04B 19/00* (2006.01)
*B03C 5/02* (2006.01)

(52) U.S. Cl.
USPC .......................................... 204/600; 204/450

(58) Field of Classification Search .................. 204/450, 204/600; 210/500.21, 500.27, 506; 264/291, 264/320, 339; 239/44
See application file for complete search history.

(56) References Cited

U.S. PATENT DOCUMENTS

2006/0255171 A1* 11/2006 Krupenkin et al. ............. 239/44
2006/0266700 A1* 11/2006 Ku et al. ................... 210/500.21

FOREIGN PATENT DOCUMENTS

| WO | WO2005053836 | 6/2005 |
| WO | WO2005096065 | 10/2005 |
| WO | WO2005096066 | 10/2005 |
| WO | WO2007022311 | 2/2007 |

OTHER PUBLICATIONS

Lifton et al. (Bell Labs Technical Journal 10(3), pp. 81-85, 2005).*
Lifton et al. (Micro scale addressable superhydrophobic reserved batteries using nanostructured materials, in Proc. 42nd Power Sources Conf., Jun. 2006, pp. 1-4).*
Bhat et al., "Nonwoven electrowetting textiles," *Applied Physics Letters* 91:024103-1-3 (2007).
Reserve Battery Architecture Based on Superhydrophobic Nanostructured Surfaces; Victor A. Lifton; 2005; Lucent Technologies, Inc.; Published by Wiley Peridicals, Inc.

* cited by examiner

*Primary Examiner* — J. Christopher Ball
*Assistant Examiner* — Jennifer Dieterle
(74) *Attorney, Agent, or Firm* — Jason L. Gilbert

(57) ABSTRACT

A fluidic device includes a porous substrate, a wetting region extending through a first portion of the porous substrate from a first side of the substrate, in which the wetting region is permeable to fluid transport, and a non-wetting region extending through a second portion of the porous substrate from a second side of the substrate, in which the non-wetting region is operable to switch between a first state impermeable to fluid transport and a second state permeable to fluid transport.

9 Claims, 6 Drawing Sheets

DEVICE FOR FLUID SPREADING AND TRANSPORT

BACKGROUND

This disclosure relates to a device for fluid spreading and transport.

Structures exhibiting hydrophobic and hydrophilic properties are important elements in microfluidic systems that require the control of fluid position and flow. One technique that is commonly used to control the movement of liquids in microfluidic systems is known as electrowetting. Electrowetting entails the application of an electric voltage across a liquid and an underlying dielectric such that the balance of interfacial surface tension forces is altered and the shape of the liquid is modified. In many cases, it is desirable to use electrowetting as a means to transfer a liquid through a porous micro or nano-structure. However, the fabrication of porous micro and nano-structures using MEMS and nano-processing techniques is often complicated and expensive. In addition, it is difficult to transfer the liquid through the entire structure. In some cases, wicking materials are placed adjacent to the porous structures to improve the liquid transfer. However, the use of such materials can increase device fabrication steps and costs.

SUMMARY

The details of one or more implementations of the invention are set forth in the description below, the accompanying drawings and the claims.

In one aspect, a fluidic device includes a porous substrate, a wetting region extending through a first portion of the porous substrate from a first side of the substrate, in which the wetting region is permeable to fluid transport, and a non-wetting region extending through a second portion of the porous substrate from a second side of the substrate, in which the non-wetting region is operable to switch between a first state impermeable to fluid transport and a second state permeable to fluid transport.

Some implementations include one or more of the following features.

In some cases, the fluidic device further includes an electrical source coupled to the non-wetting region, in which the electrical source provides a voltage between the non-wetting region and a fluid supported by the non-wetting region.

In certain implementations, the non-wetting region is operable to switch between a first state impermeable to fluid transport and a second state permeable to fluid transport upon application of a voltage across the non-wetting region and a fluid supported by the non-wetting region.

In some examples, the porous substrate includes filaments.

In certain cases, the porous substrate includes a textile.

In some implementations, the porous substrate includes micro-pores. In some cases, the porous substrate includes nano-pores.

In certain examples, the porous substrate includes a conformal coating having a conductive layer and a dielectric layer.

In some cases, the non-wetting region includes a non-wetting coating.

In certain implementations, the porous substrate includes an electrically conductive material. In some examples, the porous substrate includes a conformal coating having a dielectric layer.

In certain cases, the porous substrate is flexible.

In certain examples, the wetting region and non-wetting region are adjacent to each other.

In some cases, the non-wetting region is super-hydrophobic.

In certain implementations, the porous substrate includes a first porous material fixed to a second porous material.

In some implementations, the porous substrate includes a wicking material to enhance fluid transport permeability.

In some cases, the porous substrate includes a wicking material to inhibit fluid transport permeability.

In another aspect, a method of transporting a fluid through a fluidic device includes placing a fluid on a surface of the fluidic device having a wetting region and non-wetting region, and actuating the fluidic device to cause the fluid to move through the non-wetting region into the wetting region. The fluidic device includes a porous substrate, in which the wetting region is permeable to fluid transport extending through a first portion of the porous substrate and the non-wetting region is impermeable to fluid transport extending through a second portion of the fluidic device.

In some implementations, actuating the fluidic device includes transforming the non-wetting region into a region permeable to fluid transport.

In certain cases, actuating the fluidic device includes applying a voltage cross the fluid and the non-wetting region.

In another aspect, a method of fabricating a fluidic device includes applying a conformal coating to a porous substrate, applying a non-wetting coating to the conformal coating and removing the non-wetting coating from the conformal coating to form a wetting region permeable to fluid transport and a non-wetting region impermeable to fluid transport, in which the wetting region extends from a first side of the porous substrate through a first portion of the substrate and wherein the non-wetting region extends from a second side of the porous substrate through a second portion of the substrate.

In some cases, the porous substrate includes an electrically conductive material and the conformal coating includes a dielectric layer.

In certain examples, the conformal coating includes an electrically conductive layer and a dielectric layer.

In some implementations, the method of fabricating a fluidic device further includes coupling an electric source to the non-wetting region.

In certain cases, the method of fabricating a fluidic device further includes fixing a first porous material to a second porous material to form the porous substrate.

In some examples, removing the non-wetting coating includes exposing the porous substrate to plasma.

In certain implementations, removing the non-wetting coating includes exposing the porous substrate to ultraviolet radiation and ozone.

Other features of the invention will be apparent from the description, drawings, and from the claims.

BRIEF DESCRIPTION OF THE DRAWINGS

FIG. 1A shows an example of an electrowetting arrangement.

DETAILED DESCRIPTION

Figure 1B:
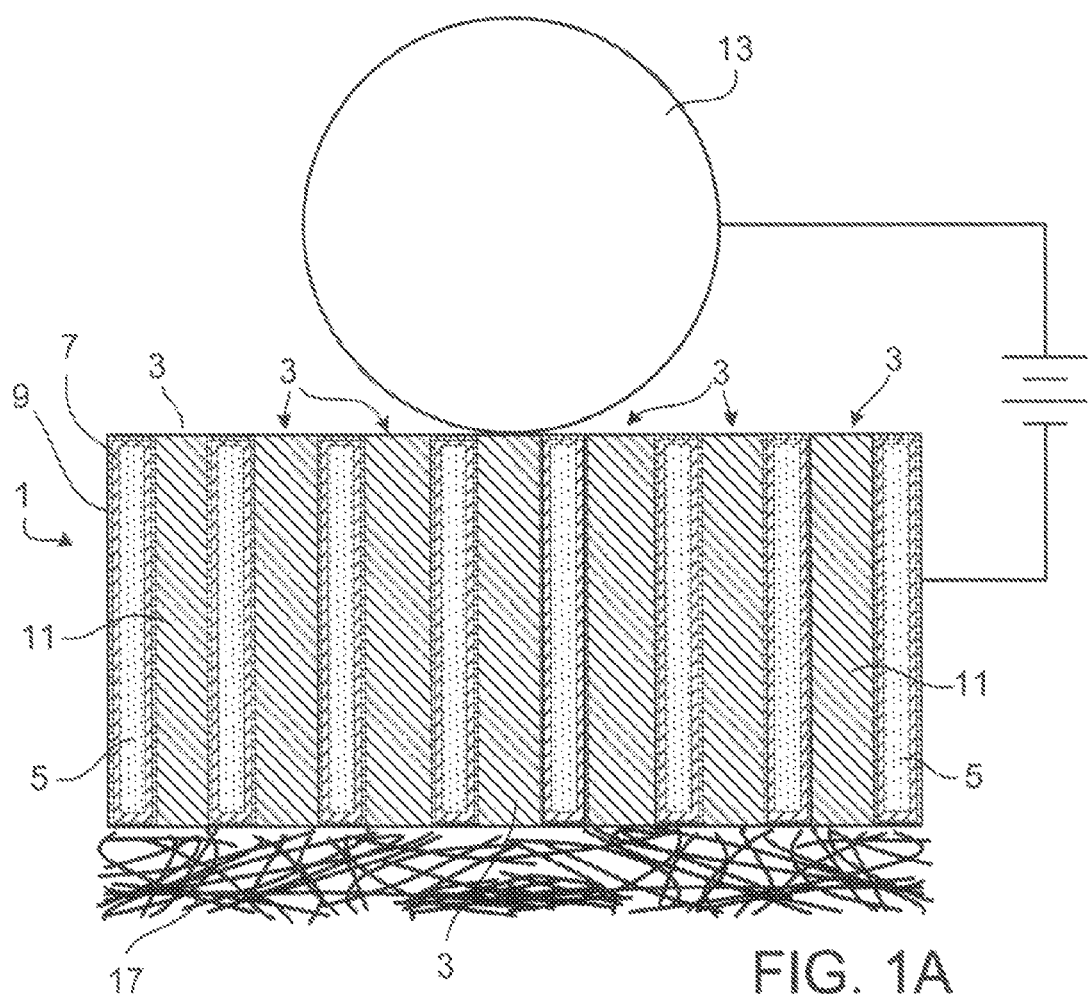
FIG. 1B shows an example of a structure in an electrowetting arrangement.
Figure 1B:
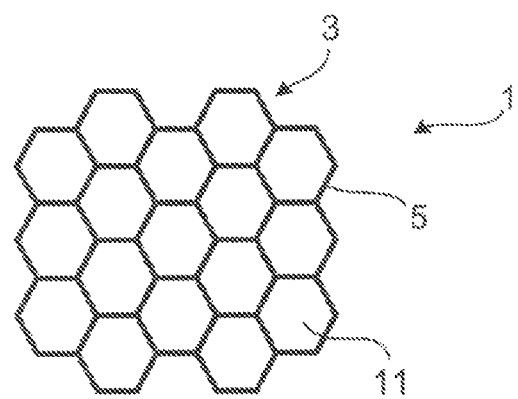

FIG. 1A shows a side view of an example electrowetting arrangement that includes a nano-fabricated structure 1. A top view of the structure 1 in the electrowetting arrangement is illustrated in FIG. 1B. The structure 1 includes a series of cells 3, arranged in a honeycomb fashion, in which the walls 5 of each cell are formed from a conductive material. In addition to the honeycomb arrangement, the cells can be arranged in other ordered and disordered configurations. Although the shape of the cell opening is shown with a hexagonal structure (see FIG. 1B), other cell shapes can be used as well, such as circles, squares and triangles, among others. The conductive walls 5 are covered with a dielectric material 7 and a non-wetting coating 9. Depending on the size of the openings 11 in each cell 3, the structure 1 may exhibit non-wetting, i.e., hydrophobic, properties. For the purposes of this disclosure, hydrophobic structures are generally characterized as having surfaces on which liquids exhibit contact angles above approximately 90 degrees. In some cases, a non-wetting structure may be classified as super-hydrophobic. For the purposes of this disclosure, a super-hydrophobic structure is generally characterized as having surfaces on which liquids exhibit contact angles between 120 and 180 degrees. In contrast, a hydrophilic structure is generally characterized, for the purposes of this disclosure, as having surfaces on which a liquid preferentially spreads. In the case of a hydrophilic surface, a liquid would exhibit contact angles below 90 degrees.

In general, the contact angle of a liquid corresponds to the angle between the liquid-vapor interface and the liquid-solid interface at the substrate surface. A liquid droplet 13 placed on the surface of the super-hydrophobic structure 1 can freely move with minimal friction.

By applying a voltage across the droplet 13 and a cell 3 in the structure 1, it is possible to take advantage of the electrowetting effect and reduce the contact angle of the liquid 13 so that it is immobilized on the structure surface. If there is significant reduction in the contact angle, it is possible to force the droplet 13 to penetrate into the openings 11 of the cells 3.

Figure 2:
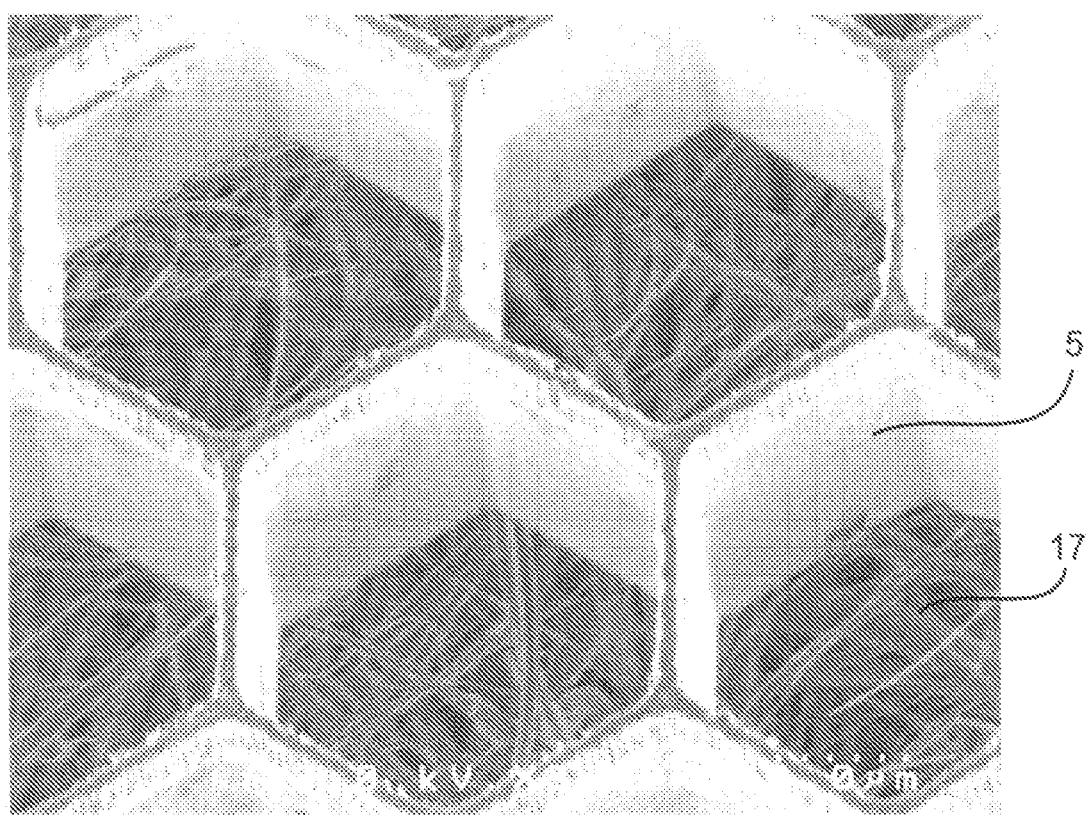
FIG. 2 is an example scanning electron microscope image of a wicking material viewed through a structure.

In many cases, electrowetting is insufficient as a means of inducing the liquid 13 to pass through the openings 11 of the structure 1. This is largely the result of restrictive forces such as adhesive forces between liquid molecules and the cell walls 5 and cohesive forces of molecular attraction between the molecules of the liquid 13. To facilitate the passage of the liquid 13 through the openings, a wicking material 17 may be positioned adjacent to the openings 11 of the cells 3. A scanning electron microscope image of a wicking material 17 viewed through a honeycomb membrane structure 1 is shown in FIG. 2. However, the use of wicking materials 17 in combination with the structure 1 can lead to increases in device fabrication steps and costs. Furthermore, nano-fabrication of the structure 1 itself is a timely and complicated process.

Figure 3A:
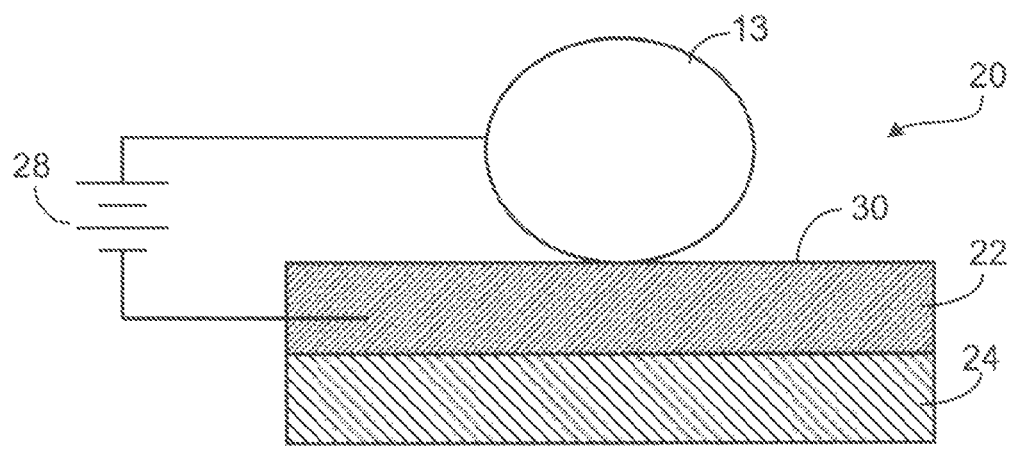
FIGS. 3A-3B show examples of an electrowetting actuated device.
Figure 3B:
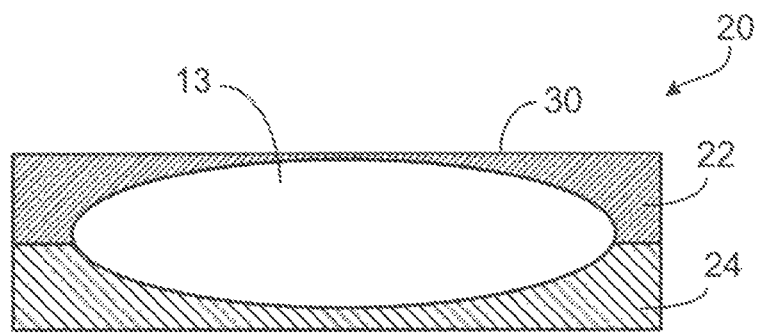

FIGS. 3A-3B show examples of an electrowetting actuated device 20 according to a first implementation that serves as both a super-hydrophobic porous membrane and wicking material in a single monolithic element. Furthermore, the device 20 requires minimal fabrication steps. As illustrated in FIG. 3A, the device 20 is composed of a single porous substrate 30 arranged into two adjacent regions: a hydrophobic, non-wetting first region 22 and a hydrophilic, wetting second region 24. Due to the non-wetting nature of the first region 22, a liquid droplet 13 placed on the surface of the first region 22 displays minimal affinity for spreading such that a spherically shaped droplet having a contact angle greater than or equal to 120 degrees is formed. Furthermore, the non-wetting region 22 is substantially impermeable to the liquid 13 such that the liquid cannot penetrate into the porous regions of the substrate 30. In contrast, a liquid 13 placed on the wetting second region 24 is absorbed by the second region 24 as would occur in a wicking material. Therefore, in some cases, the non-wetting region 22 serves as a barrier which prevents the liquid 13 from passing through the device 20 into the wetting region 24.

Upon applying a voltage 28 across the droplet 13 and the non-wetting first region 22, however, the liquid contact angle is modified such that the liquid 13 begins to wet the region 22. When the surface of region 22 is wetted, it becomes permeable to the liquid 13 and, therefore, the liquid 13 penetrates into the porous regions of the substrate 30. As the liquid 13 permeates through the region 22, the liquid 13 comes into contact with the wetting region 24 where it spreads by wicking action as shown in FIG. 3B, thereby facilitating the passage of the liquid 13 through the porous openings of the device 20.

Figure 4A:
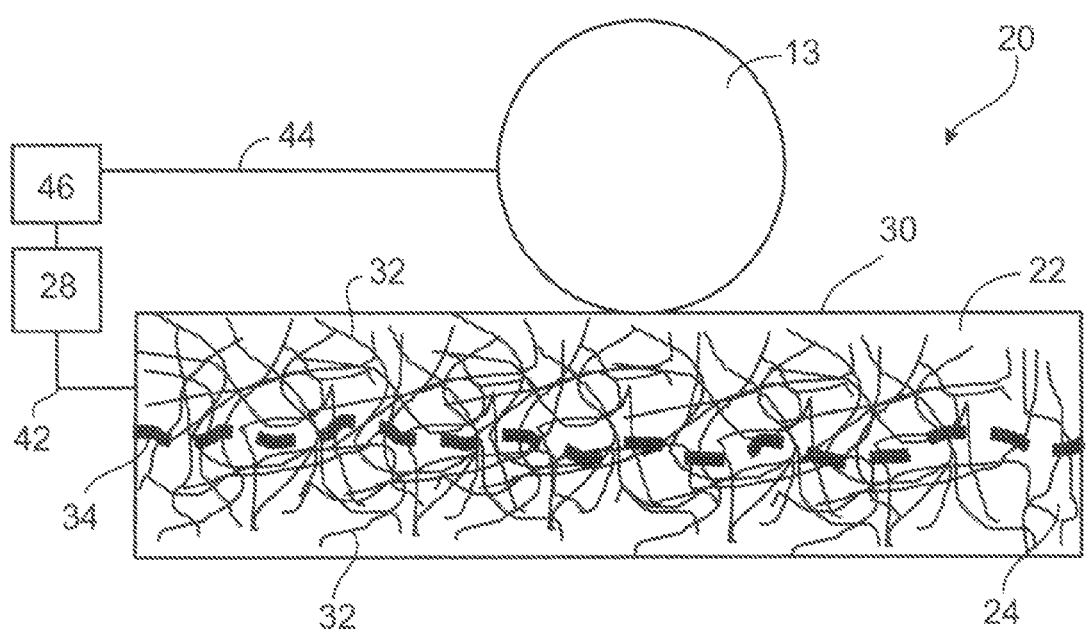
FIG. 4A illustrates an example of an electrowetting actuated device.

The structure of the electrowetting actuated device 20 is illustrated in FIG. 4A. In some implementations, the porous substrate 30 is formed from a composition of woven or non-woven materials, such as quartz fiber filters, textiles and polymeric filters that include a network of natural or artificial filaments 32, e.g. fibers. The substrate material can be obtained from commercial sources or, alternatively, manufactured, for example, by forming fibers and layering the fibers on top of each other. The substrate 30 also can be formed from a material having ordered or disordered micro-pores that do not require micro or nano-fabrication to form the pores including, for example, polyvinylidene fluoride (PVDF). In some cases, the substrate material is flexible which offers the advantage of enhanced device durability.

In certain implementations, the wicking material is selected based on how it interacts with liquids of differing surface tension values. That is to say, depending on the wicking material chosen, a liquid with a high surface tension may exhibit an increase or decrease in wetting compared to a low surface tension liquid on the same material. For example, in some cases, a wicking material, e.g., cotton, easily wets upon contact with a high surface tension liquid such as water. In contrast, cotton will not easily wet with a liquid having a low surface tension such as oil. In some cases the wicking material's wetting characteristics can be increased further (i.e., more wetting) or decreased (i.e., more non-wetting) by treating or processing the wicking material with additional coatings or exposure to UV light or plasma. For example, a porous fiber material exhibits increased hydrophilic properties when a coating of zinc oxide that has been exposed to ultraviolet radiation is applied to the fiber material. In contrast, when the zinc oxide is not exposed to ultraviolet radiation and then applied to the fiber material, the material exhibits hydrophobic properties. In this way, the wicking material can be used further to inhibit or enhance/improve the spreading of liquids that pass through the porous substrate.

Figure 4B:
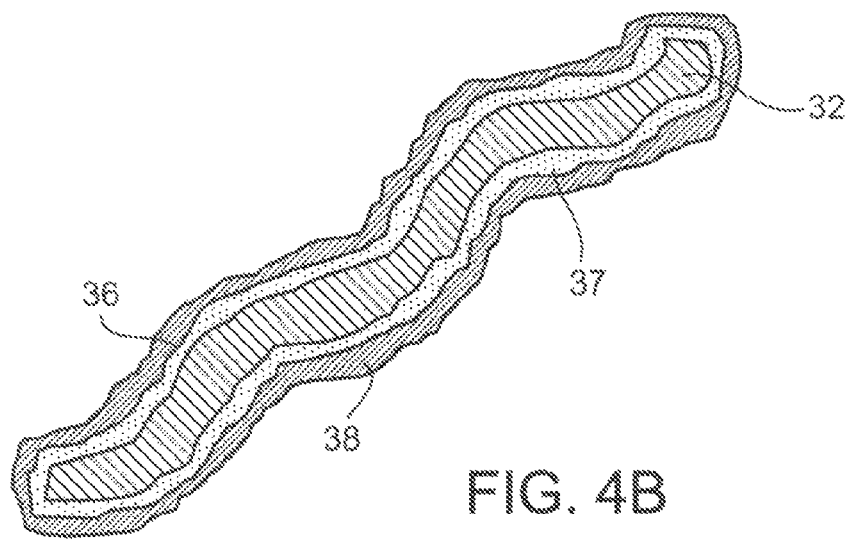
FIG. 4B illustrates an example of a filament.
Figure 4C:
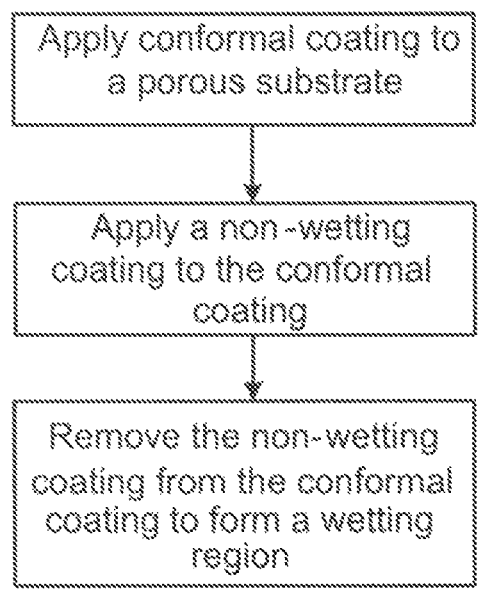
FIG. 4C illustrates a process flow diagram for fabricating a fluidic device.

A flow diagram illustrating a process for fabricating a fluidic device is shown in FIG. 4C. Each filament 32 or pore of the substrate 30 is covered with a conformal coating 36, in which the coating 36 includes a conductive material layer and a dielectric material layer. An example of a substrate filament 32 covered by the conformal coating 36 is shown in FIG. 4B.

Applying the conformal coating 36 to the substrate 30 includes depositing a first layer 37 of electrically conductive material on the bare substrate 30 such that the first layer preferably coats the exposed surfaces of any fibers, filaments or pores within the substrate 30. Following the deposition of the first layer 37, a second layer 38 of dielectric material then is deposited on the substrate 30 to coat the exposed surfaces of the first layer 37. Deposition of the first and second layers 37, 38 is performed using standard fabrication techniques such as chemical vapor deposition, thermal evaporation, and electron-beam evaporation.

In some cases, the conductive layer 37 includes a conductive polymer, such as 3,4-polyethylenedioxythiopene/polystyrenesulfonate (PEDOT/PSS), and 3,4-ethylenedioxythiophene, that can be spin-coated or dip-coated on the substrate 30. Other conductive polymers can be used as well. Similarly, in some implementations, the dielectric layer 38 also includes a material that can be either spin-coated or dip-coated including, for example, Teflon AF or CYTOP® materials. Alternatively, the dielectric can be deposited from a vapor phase, using material such as, for example, Parylene. Other deposition techniques may be used as well. The first and second layer 37, 38 should coat the exposed surfaces of the fibers, filament or pore surfaces within the substrate 30 conformally and also should maintain the porous, permeable attributes of the substrate 30. In addition, it is preferable that the conductive material of the first layer 37 be chemically and thermally resistant to the processing steps used to deposit the dielectric layer 38. The dielectric material should be chemically resistant to any liquids that are placed on it during use of the device 20. Furthermore, the dielectric material used in layer 38 should have a high dielectric strength sufficient to withstand the voltages and electric fields that may be applied to the device 20. Examples of the conductive and dielectric material pair include, but are not limited to, Ta and $Ta_2O_5$, Al and $Al_2O_3$, and Ti and TiN.

In some embodiments, the porous substrate 30 is formed from an electrically conductive material such as conductive polymers, metalized polymers (i.e., polymers on which a metal layer is deposited) or metal in a woven or non-woven composition. The substrate 30 then can be coated with the dielectric layer 38. Using an electrically conductive substrate eliminates the processing step associated with depositing conductive materials. Accordingly, fabrication costs can be reduced, and device throughput can be increased.

Following deposition of the dielectric second layer 38, the surface of the dielectric 38 is modified with a thin non-wetting coating layer (not shown) that makes the substrate 30 impermeable to fluid transport. The non-wetting coating can include low surface energy materials such as polytetrafluoroethylene, fluoropolymers, CYTOP® material, and self-assembled monolayers. Other non-wetting coatings may be used as well. The coating can be deposited using techniques such as chemical vapor deposition, vapor-deposition, spin-coating and dip-coating. Other deposition techniques may be used as well. Preferably, the chosen hydrophobic coating deposition method is compatible with the processing steps used to deposit the conductive and dielectric layers. The thickness of the non-wetting coating can range from several nanometers to several microns. In some implementations, the combination of the non-wetting coating and the porous substrate 30 results in a device 20 that exhibits surfaces with super-hydrophobic properties.

Once the non-wetting coating is deposited on the device 20, the device backside is exposed to a surface modification treatment. The surface modification treatment serves to partially or wholly remove the non-wetting coating from the filament or pore surfaces on the device backside such that wetting region 24 is formed (see FIG. 4A). A boundary 34 between the wetting region 24 and non-wetting region 22 is identified by the dashed line in FIG. 4A. The surface modification treatment can include, for example, radiating the device backside with plasma or exposing the device backside to ozone or ultraviolet radiation. Preferably, the non-wetting coating is eliminated from the surface of any fibers, filaments, crevices or pores to which it is attached in the wetting region 24. In some cases, the removal process also oxidizes the surface of the filaments or pores within substrate 30 so that the hydrophilic wetting properties are enhanced. As a result of non-uniform processing conditions, the depth of the boundary 34 between the wetting and non-wetting regions can vary along the length and width of the substrate 30.

By varying the process conditions of the surface modification treatment, such as power, gas flow and exposure time, it also is possible to vary the depth to which the hydrophilic properties extend within the substrate 30. For example, short exposure times result in a hydrophilic region that is relatively shallow compared to the thickness of the substrate 30. In contrast, long exposure times can create a large hydrophilic wetting region that is comparable to the thickness of the substrate 30. Regions of the substrate 30 in which the non-wetting coating is not removed retain their hydrophobic non-wetting properties.

As illustrated in FIG. 4A, a first conductive element 42 coupled to a voltage source 28 is electrically and physically connected to the conductive layer 37 of the conformal coating 36 in the non-wetting region 22. The conductive element 42 can be connected to the conductive material using standard techniques such as soldering. A second conductive element 44 also is coupled to the voltage source 28 and is electrically and physically connected to a liquid 13 placed on the non-wetting surface. The voltage source 28 can be coupled to a trigger or switch 46 that allows control over the application of the electric potential across the liquid 13 and non-wetting region 22. When the switch 46 is turned on, the electrowetting forces induce the liquid 13 to penetrate the porous non-wetting region 22 until it comes into contact with the wetting section 24 of the device 20, where the liquid 13 spreads out by wicking action through the filaments 32 or pores.

By forming the electrowetting-actuated device 20 as a single monolithic unit, the time necessary to fabricate the device, in some implementations, is shortened whereas the amount of material required to form the device is reduced. Accordingly, device fabrication costs can be reduced. In addition, given that complicated micro and nano-processing techniques are not required, the fabrication process can be simplified.

Figure 5A:
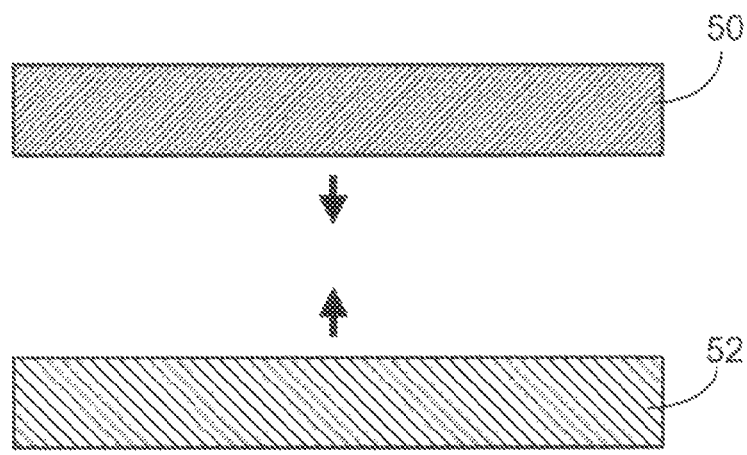
FIGS. 5A-5B illustrate an example method of fabricating an electrowetting actuated device.

A number of implementations have been described. Nevertheless, it will be understood that various modifications may be made without departing from the spirit and scope of the invention. For example, the device 20 can be formed by fixing together two separate and discrete porous materials as opposed to using a single substrate material. In the example shown in FIG. 5A, a first polymeric filter 50 is provided in which the filter 50 includes a conductive layer, a dielectric layer and super hydrophobic non-wetting coating. The conductive layer, dielectric layer and non-wetting coating can be deposited conformally on the surfaces of fibers within the filter 50 in a manner similar to the process described with reference to FIG. 4A. The first polymeric filter 50 then is fixed to a second polymeric filter 52. Various methods of adhesion may be used to fix the substrates together. For example, in some implementations, the first substrate can bond with second substrate by means of Van der Waals forces. If there is a large contact area between the two substrates, the total Van der Waals force can be high, providing significant adhesion strength. In another example, a liquid can be applied between the substrates such that, as the liquid dries, capillary forces pull the substrates closer together and increase the contact area where Van der Waals bonding can occur. Alternatively, or in addition, fibers from the first filter 50 and second filter 52 can interlock to hold the materials together, adhering them in a manner that is similar to the use of VELCRO® tape.

In contrast to the first polymeric filter 50, the fibers and filaments of the second polymeric filter 52 are not covered with a conductive, dielectric or non-wetting coating. Rather, the filter 52 is kept free of contamination so as to maintain hydrophilic wetting properties. Accordingly, when the first and second filters 50, 52 are fixed together, a liquid droplet 13 placed on the surface of the first filter 50 is precluded from penetrating into the second filter 52 as a result of the non-wetting characteristics of the first filter 50.

Figure 5B:
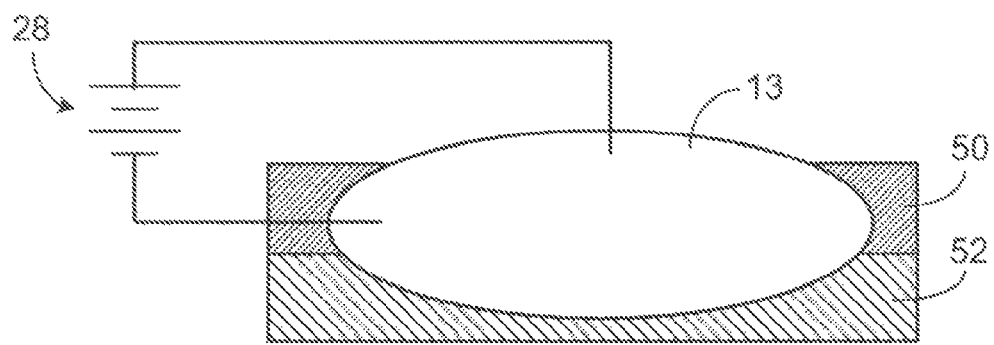

However, upon applying a voltage 28 across the droplet and the conductive layer of the first filter 50 as shown in FIG. 5B, the liquid 13 penetrates through the first filter 50 and is absorbed into the wetting second filter 52. Accordingly, the device 20 shown in FIG. 5B provides control over fluid spreading and transport and can be fabricated without requiring complicated micro and nano-processing techniques. In some implementations, the first filter 50, the second filter 52 or both filters are replaced with substrates having micro-pores, in which the average diameter of a pore is in the range of 1 micron to several thousand microns, or nano-pores, in which the average diameter of a pore is in the range of 1 nanometer to several thousand nanometers.

Other implementations also are within the scope of the claims.

What is claimed is:

1. A fluidic device comprising:
    a porous substrate, wherein said porous substrate includes a network of filaments, wherein said network of filaments is comprised of a first plurality of filaments and a second plurality of filaments, wherein said first plurality of filaments is comprised of filaments exposed to a surface modification treatment, wherein each of said second plurality of filaments is covered with a conformal coating, wherein said conformal coating includes a conductive material layer and a dielectric material layer;
    a wetting region comprised of said first plurality of filaments extending through a first portion of the porous substrate from a first side of the substrate, wherein the wetting region is permeable to fluid transport, wherein;
    a non-wetting region comprised of said second plurality of filaments extending through a second portion of the porous substrate from a second side of the substrate, wherein the non-wetting region is operable to switch between a first state impermeable to fluid transport and a second state permeable to fluid transport; and
    an electrical source coupled to the non-wetting region to provide a voltage between the non-wetting region and a fluid on the non-wetting region.

2. The fluidic device according to claim 1 wherein the non-wetting region is operable to switch between a first state impermeable to fluid transport and a second state permeable to fluid transport upon application of a voltage across the non-wetting region and a fluid supported by the non-wetting region.

3. The fluidic device according to claim 1 wherein said conductive material layer includes a conductive polymer.

4. The fluidic device according to claim 1 wherein the porous substrate comprises a textile.

5. The fluidic device according to claim 1 wherein the porous substrate comprises micro-pores.

6. The fluidic device according to claim 1 wherein the porous substrate comprises nano-pores.

7. The fluidic device according to claim 1 wherein the porous substrate is flexible.

8. The fluidic device according to claim 1 wherein the wetting region and non-wetting region are adjacent to each other.

9. The fluidic device according to claim 1 wherein the non-wetting region is super-hydrophobic.

* * * * *